United States Patent
Gibson

(10) Patent No.: US 9,216,756 B1
(45) Date of Patent: Dec. 22, 2015

(54) WEARABLE AND STEERABLE SNOW SLED

(71) Applicant: Warren Michael Gibson, Grants Pass, OR (US)

(72) Inventor: Warren Michael Gibson, Grants Pass, OR (US)

(*) Notice: Subject to any disclaimer, the term of this patent is extended or adjusted under 35 U.S.C. 154(b) by 0 days.

(21) Appl. No.: 14/532,482

(22) Filed: Nov. 4, 2014

Related U.S. Application Data

(60) Provisional application No. 61/902,003, filed on Nov. 8, 2013.

(51) Int. Cl.
  *B62B 13/00* (2006.01)
  *B62B 13/02* (2006.01)
(52) U.S. Cl.
  CPC ..................... *B62B 13/02* (2013.01)
(58) Field of Classification Search
  CPC ................ B62B 13/00; B62B 13/02
  USPC ....................................... 280/16, 27
  See application file for complete search history.

(56) References Cited

U.S. PATENT DOCUMENTS 4,413,832 A * 11/1983 Pendleton ............... 280/845
5,486,013 A * 1/1996 Kilk et al. ............... 280/18.1

* cited by examiner

*Primary Examiner* — J. Allen Shriver, II
*Assistant Examiner* — Bryan Evans
(74) *Attorney, Agent, or Firm* — Plager Schack LLP

(57) ABSTRACT

Some embodiments of the present disclosure include a wearable and steerable sled for descending a sloped surface. The wearable and steerable sled may include a wearable back sled having blades extending therefrom, a pair of wrist controls, and a pair of ankle controls. The wearable back sled may attach to a user's back. The wrist controls may strap to a user's wrists. The ankle controls may strap to a user's angles. The wearable back sled may allow a user to descend a sloped surface by laying on the sloped surface with the wearable back sled positioned between the user and the sloped surface, wherein the wrist controls and the ankle controls may aid the user in steering and controlling speed at which the user descends the sloped surface.

8 Claims, 4 Drawing Sheets

WEARABLE AND STEERABLE SNOW SLED

RELATED APPLICATION

This application claims priority to provisional patent application U.S. Ser. No. 61/902,003 filed on Nov. 8, 2013, the entire contents of which is herein incorporated by reference.

BACKGROUND

The embodiments herein relate generally to extreme sports, and more particularly, to a wearable and steerable snow sled.

Many people cannot go to or enjoy ski mountains, because they either do not know how to ski or snowboard or because they are ill-capable. Specifically, these individuals may lack the balance or skill needed to ski or snowboard and may waste a lot of time and tears trying to learn.

Therefore, what is needed is an alternative device for users to enjoy ski mountains or hills, wherein the device is wearable, steerable, and requires little balance or practice to operate.

SUMMARY

Some embodiments of the present disclosure include a wearable and steerable sled for descending a sloped surface. The wearable and steerable sled may include a wearable back sled having blades extending therefrom, a pair of wrist controls, and a pair of ankle controls. The wearable back sled may attach to a user's back. The wrist controls may strap to a user's wrists. The ankle controls may strap to a user's angles. The wearable back sled may allow a user to descend a sloped surface by laying on the sloped surface with the wearable back sled positioned between the user and the sloped surface, wherein the wrist controls and the ankle controls may aid the user in steering and controlling speed at which the user descends the sloped surface.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
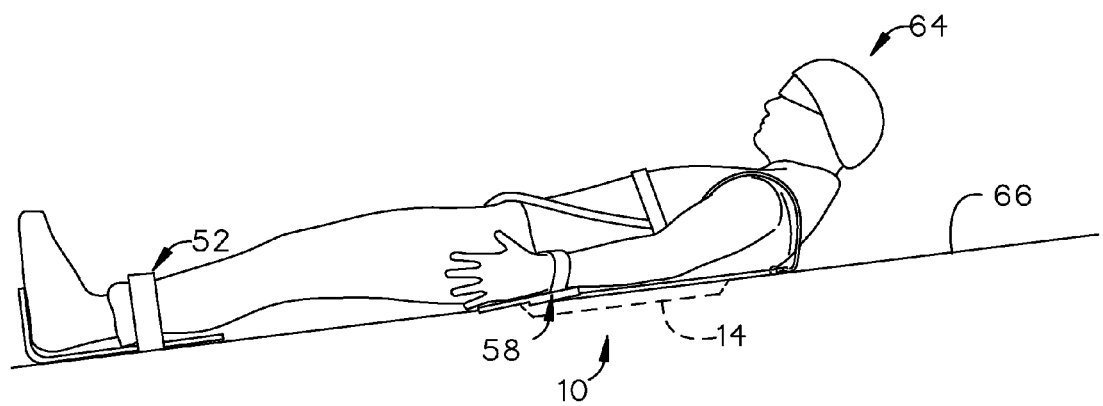
FIG. 1 is a side perspective view of one embodiment of the present invention, shown in use.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to descend a sloped surface, such as a ski mountain, and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Wearable Back Sled
2. Wrist Control
3. Ankle Control

The various elements of the wearable and steerable sled for descending a sloped surface of the present disclosure may be related in the following exemplary fashion. It is not intended to limit the scope or nature of the relationships between the various elements and the following examples are presented as illustrative examples only.

By way of example, and referring to FIGS. 1-7, some embodiments of the wearable and steerable sled of the present disclosure comprise a wearable and steerable sled for descending a sloped surface, the sled comprising a wearable back sled 10, a pair of wrist controls 58, and a pair of ankle controls 52, wherein the wearable back sled 10 is configured to strap securely to a user's 64 back and a user 64 may descend a slope 66 by laying on the slope 66 with the wearable back sled 10 positioned between the user 64 and the slope 66, wherein the wrist control 58 and the ankle control 52 are configured to aid a user in controlling the user's 64 speed and direction.

Figure 4:
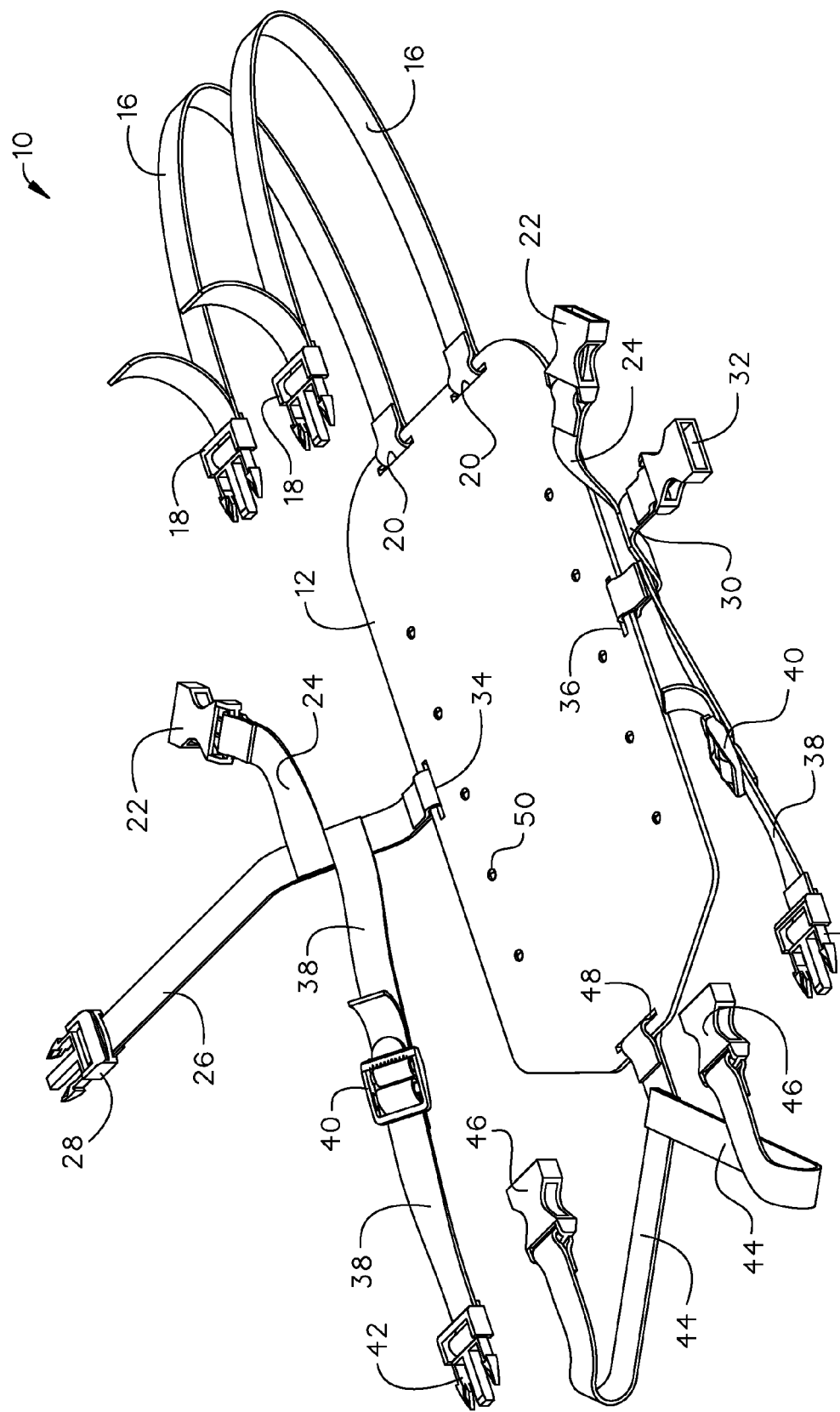
FIG. 4 is a top perspective view of one embodiment of the present invention, showing backpack sled attachment 10.
Figure 5:
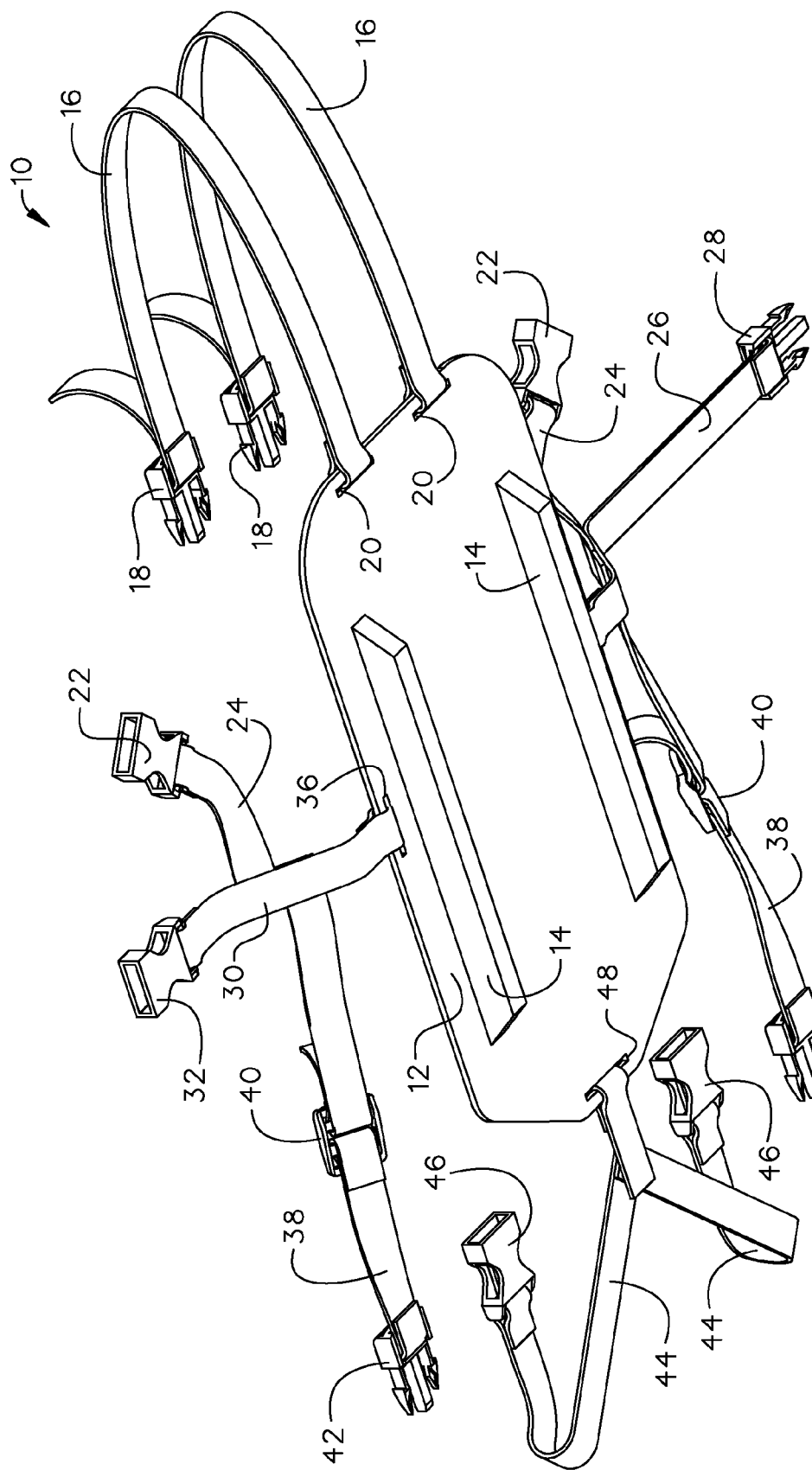
FIG. 5 is a bottom perspective view of one embodiment of the present invention, showing backpack sled attachment 10.

As shown in FIGS. 4-7, the wearable back sled 10 may comprise a plate 12 configured to be attached to a user's 64 back by a plurality of straps, wherein the plate 12 may extend from an area proximate to a user's 64 shoulders to an area past a user's 64 tailbone. The plate 12 may have a substantially rounded rectangle shape, other than the end proximate to a user's 64 tailbone, which may be substantially triangular in shape, as shown in FIG. 4. Because of the shape of the plate 12, a user's 64 tailbone may be protected while in use, and the user 64 may be able to walk normally when the plate 12 is attached to his or her back. The surface of the plate 12 opposite a user's 64 back may comprise a plurality of blades 14, such as two blades 14, extending perpendicularly therefrom, wherein the blades 14 may be attached to the plate 12 using any suitable fastening mechanism. In some embodiments, the blades 14 may be attached to the plate 12 using a plurality of blade fasteners 50.

Figure 6:
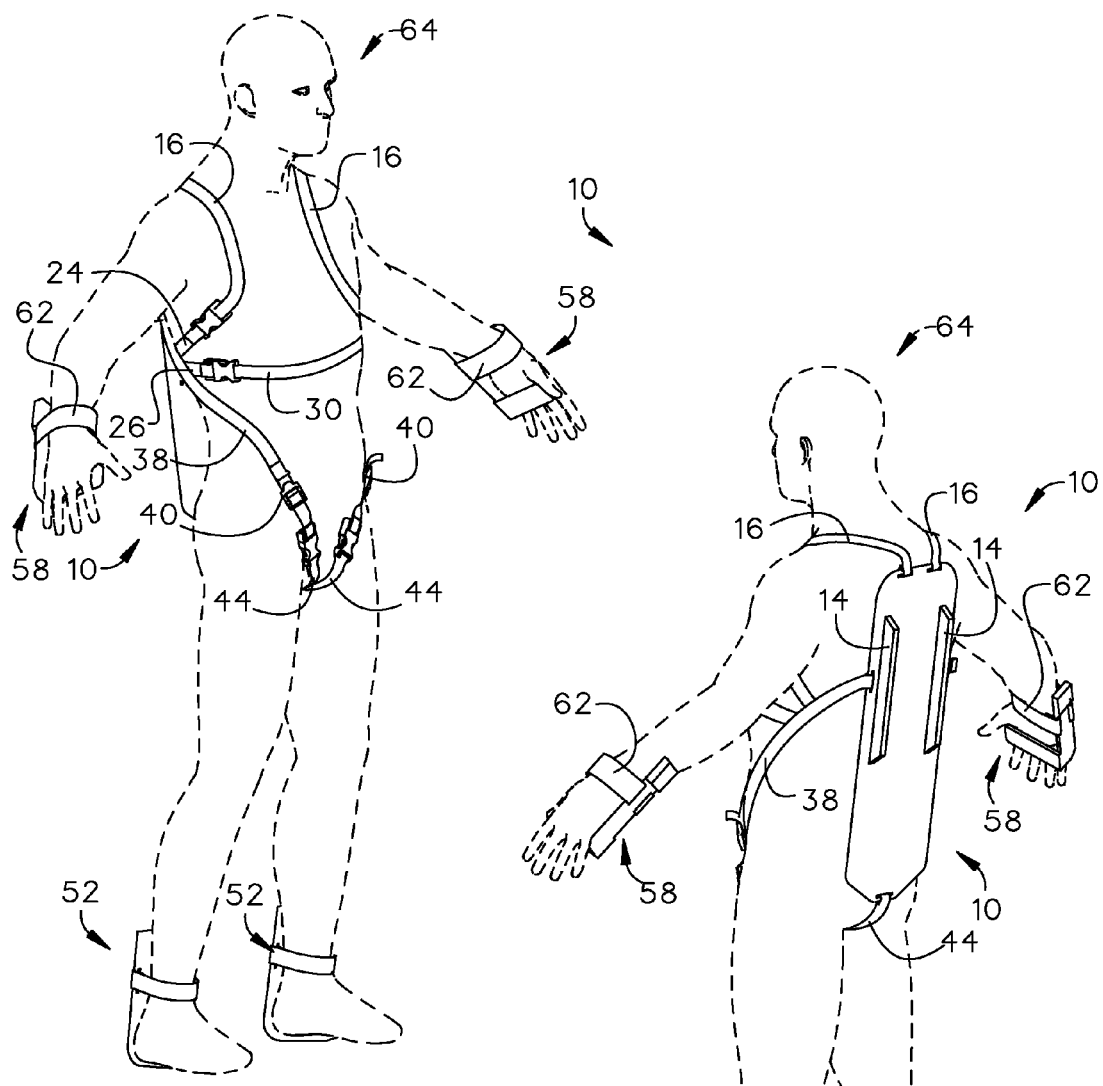
FIG. 6 is a perspective view of one embodiment of the present invention, shown in use and demonstrating anatomical application.
Figure 7:
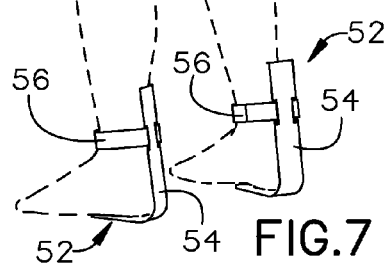
FIG. 7 is a rear perspective view of one embodiment of the present invention, shown in use and demonstrating anatomical application.

A plurality of straps may be attached to the plate 12, wherein the straps are configured to attach the plate 12 to a user's 64 back. For example, the straps may comprise a pair of upper shoulder straps 16 configured to go over the top of a user's 64 shoulders and connect to a pair of lower shoulder straps 22 by, for example, a buckle. In some embodiments, the upper shoulder straps 16 may comprise upper shoulder strap male buckles 18 configured to engage with lower shoulder strap female buckles 22. The lower shoulder straps 22 may be attached to a chest strap 28, and, in embodiments, one of the lower shoulder straps 22 may be attached to a right chest strap 26 and the second lower shoulder strap 22 may be attached to a left chest strap 30, wherein the right chest strap 26 and the left chest strap 30 may comprise a connection mechanism, such as a buckle, wherein a right chest strap male buckle 28 is attached to the right chest strap 26 and is configured to engage with a left chest strap female buckle 32 on the left chest strap 30. Extending downward from the chest strap may be a plurality of waist straps 38 configured to engage with a plurality of rear waist straps 46, which extend downward from the plate 12, wherein when the waist straps 38 are engaged with the rear waist straps 46, the straps may circle a user's 64 upper leg, proximate to the user's 64 groin. In embodiments, the rear waist straps 44 may comprise rear waist strap female buckles 46 configured to engage with waist strap male buckles 42 on the waist straps 38. When all of the straps are engaged with each other, the plate 12 may be strapped to a user's 64 back, as shown in FIGS. 6 and 7. Thus, the straps may mimic a 6-point, parachute buckle, harness system, which may not shift or lift off the user's 64 body while riding or walking. While the straps are described as engaging via female and male buckles, any fasteners may be used.

The straps may attach to the plate 12 by being looped through slots 20, 34, 36, and 48 in the plate 12 and permanently secured. The straps may comprise any suitable material and, in embodiments, comprise a nylon and/or elastic material. The straps may also have an adjustable length to accommodate users 64 of differing shape and size. For example, the waist strap 40 may be adjustable using a waist strap ladder lock 40, as shown in FIG. 4. During use, the straps may be tightened to snugly and securely hug a user's 64 body, which may increase the ease of carving and steering of the sled when in use.

Figure 2:
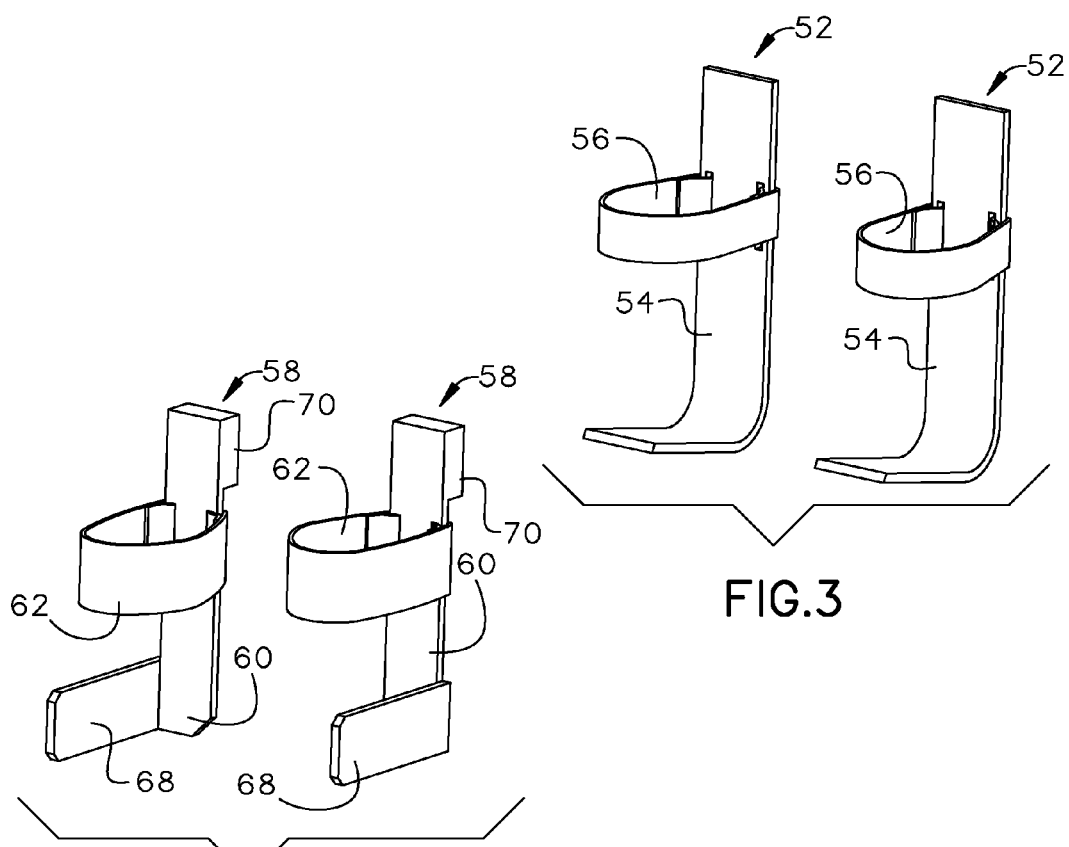
FIG. 2 is a perspective view of one embodiment of the present invention, showing wrist control(s) 58.

As shown in FIG. 2, the wrist controls 58 may comprise a wrist control bracket 60 configured to be secured to a user's 64 wrist. In some embodiments, the wrist control bracket 60 may be secured to a user's 64 wrist using a wrist control strap 62, which may be made of any material, such as a hook and loop fastener, like Velcro brand hook and loop fastener. Extending substantially perpendicularly outward from the wrist control bracket 60 may be a wrist control handle 68 configured to be positioned within a user's 64 palms when in use. A surface of the wrist control bracket 60 opposite the user may be a wrist control ledge 70, which may be used to help steer the sled and to help control the speed at which a user 64 descends the sloped surface 66.

Figure 3:
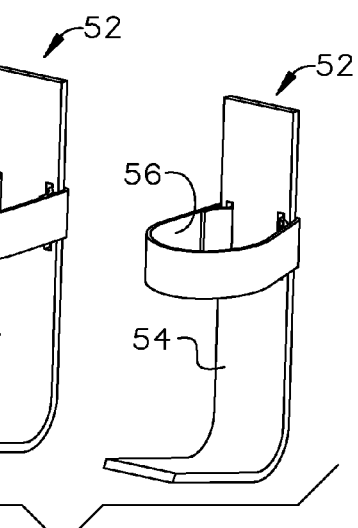
FIG. 3 is a perspective view of one embodiment of the present invention, showing ankle control(s) 52.

As shown in FIG. 3, the ankle control 52 may comprise a substantially rounded L-shape ankle bracket 54 configured to attach to a user's 64 ankles using, for example, an ankle bracket strap 56. In embodiments, the ankle bracket strap 56 may comprise a hook and loop fastener, such as Velcro brand hook and loop fastener.

The wearable and steerable sled of the present disclosure may optionally further comprise a leg brace connecting the plate 12 to the ankle controls 52, which may result in a sled capable of achieving higher speeds and having greater stability. The sled may also comprise a chest plate configured to allow a user 64 to ride down the sloped surface 66 face first on his or her stomach rather than feet first on his or her back.

The plate 12, ankle controls 52, and wrist controls 58 may be made of any suitable material and, in some embodiments, comprise a durable, light weight material. For example, the plate 12, ankle controls 52, and wrist controls 58 may be made of a thin Lexan-type material. The blades 14 may comprise ABS machine grade material.

To use the wearable and steerable sled of the present invention, a user 64 may strap the plate 12 to his her back, tightening the straps as necessary. The user 64 may then lay on the plate 12 on the sloped surface 66, such as snow on a ski mountain or hill. Using the wrist controls 58 and the ankle controls 52, the user 64 may steer the sled and may control the speed at which he or she is traveling. The user 64 may also control the direction he or she is traveling by adjusting or turning his or her body weight to the left or right.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A wearable and steerable sled for descending a sloped surface, the wearable and steerable sled comprising:
    a wearable back sled comprising a plurality of straps to removably attach the wearable back sled to a user's back, the plurality of straps comprising:
        a pair of upper shoulder straps configured to go over the top of a user's shoulders;
        a pair of lower shoulder straps configured to engage with the pair of upper shoulder straps;
        a chest strap comprising a right chest strap and a left chest strap, wherein the right chest strap and the left chest strap are configured to engage to secure around a user's chest, and wherein the lower shoulder straps are attached to the chest strap;
        a plurality of waist straps extending downward from the chest strap; and
        a plurality of rear waist straps extending from an area on the wearable back sled proximate to a user's tailbone, wherein the plurality or rear waist straps are configured to engage with the plurality of waist straps to fully encircle a user's upper leg proximate to the user's groin;
    a pair of wrist controls; and
    a pair of ankle controls,
    wherein:
    the wrist controls are configured to strap to a user's wrists;
    the ankle controls are configured to strap to a user's ankles;
    the wearable back sled is configured to allow a user to descend a sloped surface by laying on the sloped surface with the wearable back sled positioned between the user and the sloped surface; and
    the wrist controls and the ankle controls are configured to aid the user in steering and controlling speed at which the user descends the sloped surface.

2. The wearable and steerable sled of claim 1, wherein the wearable back sled comprises:
    a plate configured to be attached to a user's back by the plurality of straps, wherein the plate extends from an area proximate to a user's shoulders to an area past a user's tailbone; and
    a plurality of blades attached to a surface of the plate opposite a user's back, wherein the blades extend substantially perpendicularly from the surface of the plate.

3. The wearable and steerable sled of claim 1, wherein the plurality of straps creates a 6-point, parachute buckle, harness system.

4. The wearable and steerable sled of claim 1, wherein:
    the upper shoulder straps comprise upper shoulder strap male buckles configured to engage with lower shoulder strap female buckles on the lower shoulder straps;
    the right chest strap comprises a right chest strap male buckle configured to engage with a left chest strap female buckle on the left chest strap; and
    the rear waist straps comprise rear waist strap female buckles configured to engage with waist strap male buckles on the waist straps.

5. The wearable and steerable sled of claim 1, wherein all of the straps are adjustable in length.

6. The wearable and steerable sled of claim 1, wherein the wrist controls comprise:
   a wrist control bracket;
   a wrist control strap extending from the wrist control bracket, the wrist control strap configured to removably attach the wrist control bracket to the user's wrist;
   a wrist control handle extending substantially perpendicularly outward from the wrist control bracket, the wrist control handle being configured to be positioned within a user's palm when in use; and
   a wrist control ledge extending from a surface of the wrist control bracket opposite the user's wrist.

7. The wearable and steerable sled of claim 1, wherein the ankle control comprises a substantially rounded L-shape ankle bracket configured to removably attach to a user's ankle by an ankle bracket strap extending from the ankle bracket.

8. A wearable and steerable sled for descending a sloped surface, the wearable and steerable sled comprising:
   a wearable back sled comprising:
      a plate configured to attach to a user's back by a plurality of straps, wherein the plate extends from an area proximate to a user's shoulders to an area past a user's tailbone and wherein the plurality of straps creates a 6-point, parachute buckle, harness system, the plurality of straps comprising:
         fair of upper shoulder straps configured to go over the top of a user's shoulders;
         a pair of lower shoulder straps configured to engage with the pair of upper shoulder straps;
         a chest strap comprising a right chest strap and a left chest strap, wherein the right chest strap and the left chest strap are configured to engage to secure around a user's chest, and wherein the lower shoulder straps are attached to the chest strap;
         a plurality of waist straps extending downward from the chest strap; and
         a plurality of rear waist straps extending from an area on the plate proximate to the user's tailbone, wherein the plurality or rear waist straps are configured to engage with the plurality of waist straps to fully encircle a user's upper leg proximate to the user's groin; and
      a plurality of blades attached to a surface of the plate opposite a user's back, wherein the blades extend substantially perpendicularly from the surface of the plate;
   a pair of wrist controls, each wrist control comprising:
      a wrist control bracket;
      a wrist control strap extending from the wrist control bracket, the wrist control strap configured to removably attach the wrist control bracket to the user's wrist;
      a wrist control handle extending substantially perpendicularly outward from the wrist control bracket, the wrist control handle being configured to be positioned within a user's palm when in use; and
      a wrist control ledge extending from a surface of the wrist control bracket opposite the user's wrist; and
   a pair of ankle controls, each ankle control comprising substantially rounded L-shape ankle bracket configured to removably attach to a user's ankle by an ankle bracket strap extending from the ankle bracket,
   wherein:
   the wearable back sled is configured to attach to a user's back;
   the wrist controls are configured to strap to a user's wrists;
   the ankle controls are configured to strap to a user's ankles;
   the wearable back sled is configured to allow a user to descend a sloped surface by laying on the sloped surface with the wearable back sled positioned between the user and the sloped surface; and
   the wrist controls and the ankle controls are configured to aid the user in steering and controlling speed at which the user descends the sloped surface.

\* \* \* \* \*